United States Patent
Gorman et al.

(12) 
(10) Patent No.: US 6,205,203 B1
(45) Date of Patent: Mar. 20, 2001

(54) TELEPHONE ACTIVATED EMERGENCY RESPONSE SYSTEM

(76) Inventors: Andrew J. Gorman, 19 Stagecoach La., Wolcott, CT (US) 06716; Edward W. Bender, 48 E. Starrs Plain Rd., Danbury, CT (US) 06810

( * ) Notice: Subject to any disclaimer, the term of this patent is extended or adjusted under 35 U.S.C. 154(b) by 0 days.

(21) Appl. No.: 09/062,624

(22) Filed: Apr. 20, 1998

(51) Int. Cl.$^7$ .................................................. H04M 11/00
(52) U.S. Cl. ............................ 379/37; 379/396; 340/331; 340/539
(58) Field of Search ................................. 379/37, 38, 39, 379/396, 386; 340/332, 331, 539, 531

(56) References Cited

U.S. PATENT DOCUMENTS

| | | | |
|---|---|---|---|
| Re. 34,677 | 7/1994 | Ray et al. ............................... | 379/37 |
| D. 353,549 | 12/1994 | Gorman ................................. | 362/811 |
| 4,935,951 | 6/1990 | Robinson et al. ...................... | 379/37 |
| 4,993,058 | 2/1991 | McMinn et al. ........................ | 379/37 |
| 5,012,507 | 4/1991 | Leighton et al. ....................... | 379/37 |
| 5,621,379 | * 4/1997 | Collins .................................. | 379/37 |
| 5,638,047 | * 6/1997 | Orloff et al. .......................... | 340/539 |
| 5,748,706 | * 5/1998 | Morgan et al. ......................... | 379/37 |
| 5,838,771 | * 11/1998 | Moeller .................................. | 379/37 |
| 5,872,832 | * 2/1999 | Bishel et al. ........................... | 379/37 |
| 5,880,672 | * 3/1999 | Weaver .................................. | 379/37 |
| 5,898,369 | * 4/1999 | Godwin ................................. | 340/539 |
| 5,960,061 | * 9/1999 | Fahie et al. ............................ | 379/37 |

* cited by examiner

Primary Examiner—Stella Woo
(74) Attorney, Agent, or Firm—Willliam C. Crutcher

(57) ABSTRACT

An emergency response system has a radio transmitter activated by dialing one or more programmable sequences of emergency digits dialed on the telephone, which transmits an encoded radio signal to a flashing strobe beacon visible to an emergency response team to assist in locating the emergency. The flashing strobe beacon is responsive only to the encoded signal, is easily relocated and requires no hard wired connection.

3 Claims, 3 Drawing Sheets

TELEPHONE ACTIVATED EMERGENCY RESPONSE SYSTEM

Figure 1:
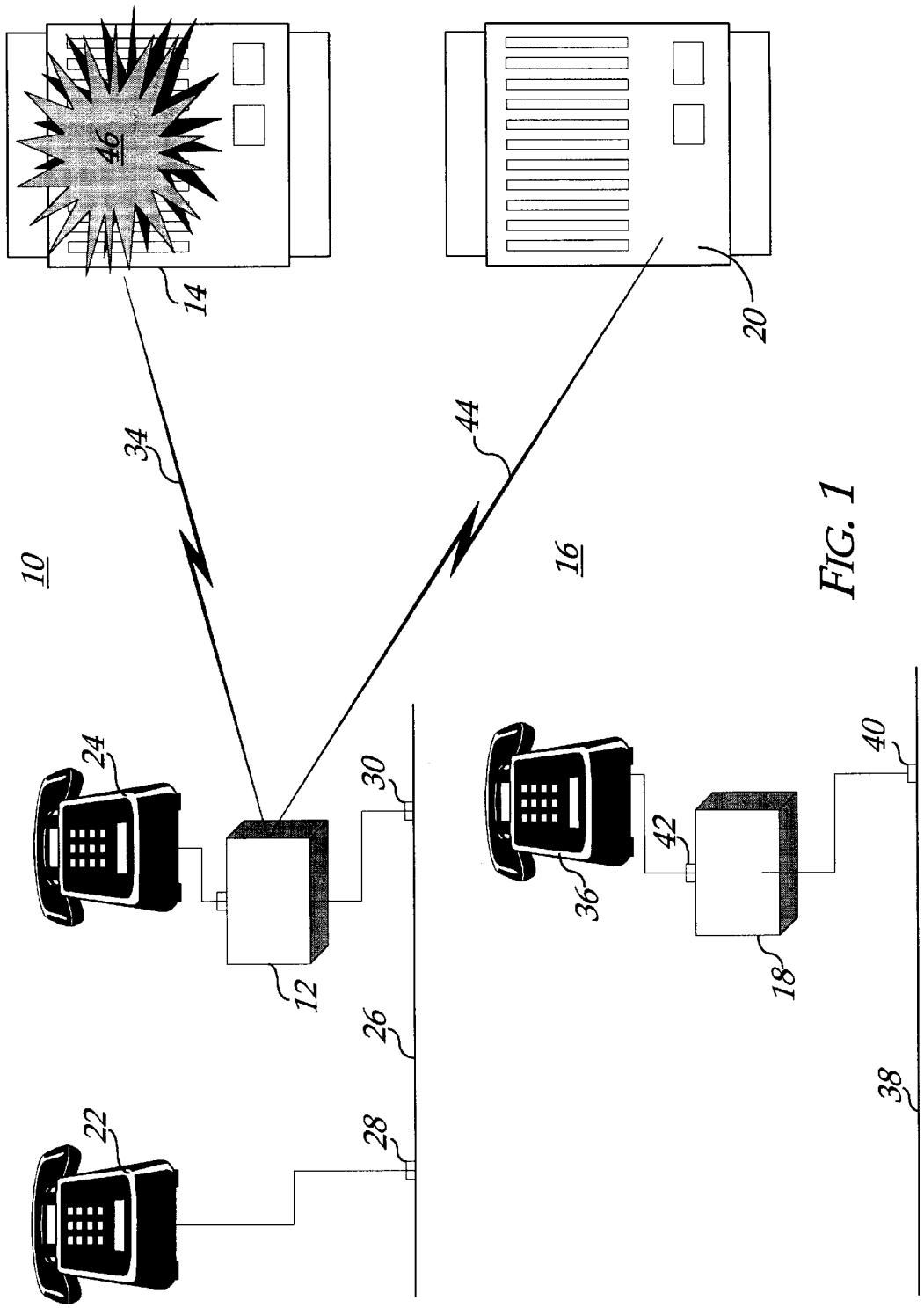

This invention relates generally to an emergency response system which is activated by dialing emergency telephone numbers and which will assist the response team in locating the source of the emergency. More particularly, the invention relates to a telephone emergency response system, which activates an external visible locating signal, such as a strobe light, without interference or false actuation of other similar emergency response systems in the same locality, and which is programmable through the telephone handset.

BACKGROUND OF THE INVENTION

A universal problem shared by police officers, fire fighters, and others responding to emergency calls is the difficulty locating the origin of a 9-1-1 call. Oftentimes, there is no name or address visible at the residence or business in distress. In condominium complexes, the problem is more acute, as many of the buildings can be indistinguishable from one another. Even in areas equipped with sophisticated networks that identify the location of the 9-1-1 caller to a dispatcher, the responding personnel often cannot quickly ascertain the location of the emergency. The critical time wasted searching for the source of an emergency can often mean the difference between life and death.

Emergency telephone activated signalling systems which activate an external house light or strobe light when a 9-1-1 telephone call is made are already known in the prior art. Examples of such systems are shown in U.S. Pat. No. 4,935,951 issued Jun. 19, 1990 to Robinson et al.; U.S. Pat. No 4,993,058 issued Feb. 12, 1991 to McMinn et al.; U.S. Pat. No. 5,012,507 issued Apr. 30, 1991 to Leighton et al.; and U.S. Pat. No. Re. 34,677 dated Jul. 26, 1994 to Ray et al. The aforesaid systems are all supplied with logic circuits to distinguish 9-1-1 when it is dialed on the user's telephone from other dialed numbers which simply contain 9-1-1 along with other digits, and to activate a flashing light visible on the exterior of the building in order to assist persons responding to the emergency to locate the call. While the systems described in the patents provide, in some cases for changing the sequence of emergency digits which is recognized, and in some cases also provide for a second sequence of digits for testing purposes, they do not disclose the ability for the user to program several emergency numbers, any one of which will actuate the flashing light. Nor do they disclose systems enabling the user to easily adjust the expected response time delay.

The installation of the systems disclosed in the aforementioned patents also requires running wiring between the telephone monitor and the external lighting device. This causes the installation to be expensive and requires re-wiring when moving the telephone monitor and the external lighting device to different locations. In larger complexes of buildings, such as apartment buildings or condominiums, the distance from the telephone to a location for the flashing light which is visible from the street may be extensive. If it is desired to have several individual emergency response systems identified with different users within a building complex, they must operate independently, and serve to identify the particular individual unit within the complex where the emergency is located.

Accordingly, one object of the invention is to provide an improved emergency response system suitable for multiple residential units within a building complex.

Another object of the invention is to provide an emergency response system with ability of the user to program one or more sequences of emergency dialed digits.

Another object of the invention is to provide an improved emergency response system with flexibility to locate the external warning device easily without re-wiring.

Another object of the invention is to provide an improved emergency response system for guiding an emergency response team to a single residential unit within a building complex or group of buildings.

SUMMARY OF THE INVENTION

Briefly stated, the invention is practiced by providing (1) a telephone monitor/transmitter adapted for connection to a telephone line with a telephone handset having keys for dialing digits, the telephone monitor/transmitter comprising electronic circuit means adapted to be connected to the telephone handset and the telephone line for generating a first signal in response to sequential dialing of at least one selected sequence of emergency digits, encoding means having a first plurality of setting switches for assigning a first selectable binary code word in response to said first signal, and a radio transmitter and modulator connected to said encoding means for transmitting a radio signal modulated by the first binary code word, and (2) at least one receiver/signal beacon comprising a radio receiver demodulator adapted to receive and demodulate the radio signal and output the first binary code word, decoding means having a second plurality of setting switches for assigning a second selectable binary code word and connected to compare it with the first binary code word and to provide a second signal when it matches the first binary code word, and emergency signalling means comprising a flashing beacon arranged for placement in a location visible to emergency rescue personnel and connected to the decoding means to be actuated by the second signal. In its preferred embodiment, the electronic circuit means includes a programmable microcontroller which is responsive to dialing programming digits on the telephone handset which can select one or more emergency dialing sequences, or perform other functions.

DRAWING

Figure 2:
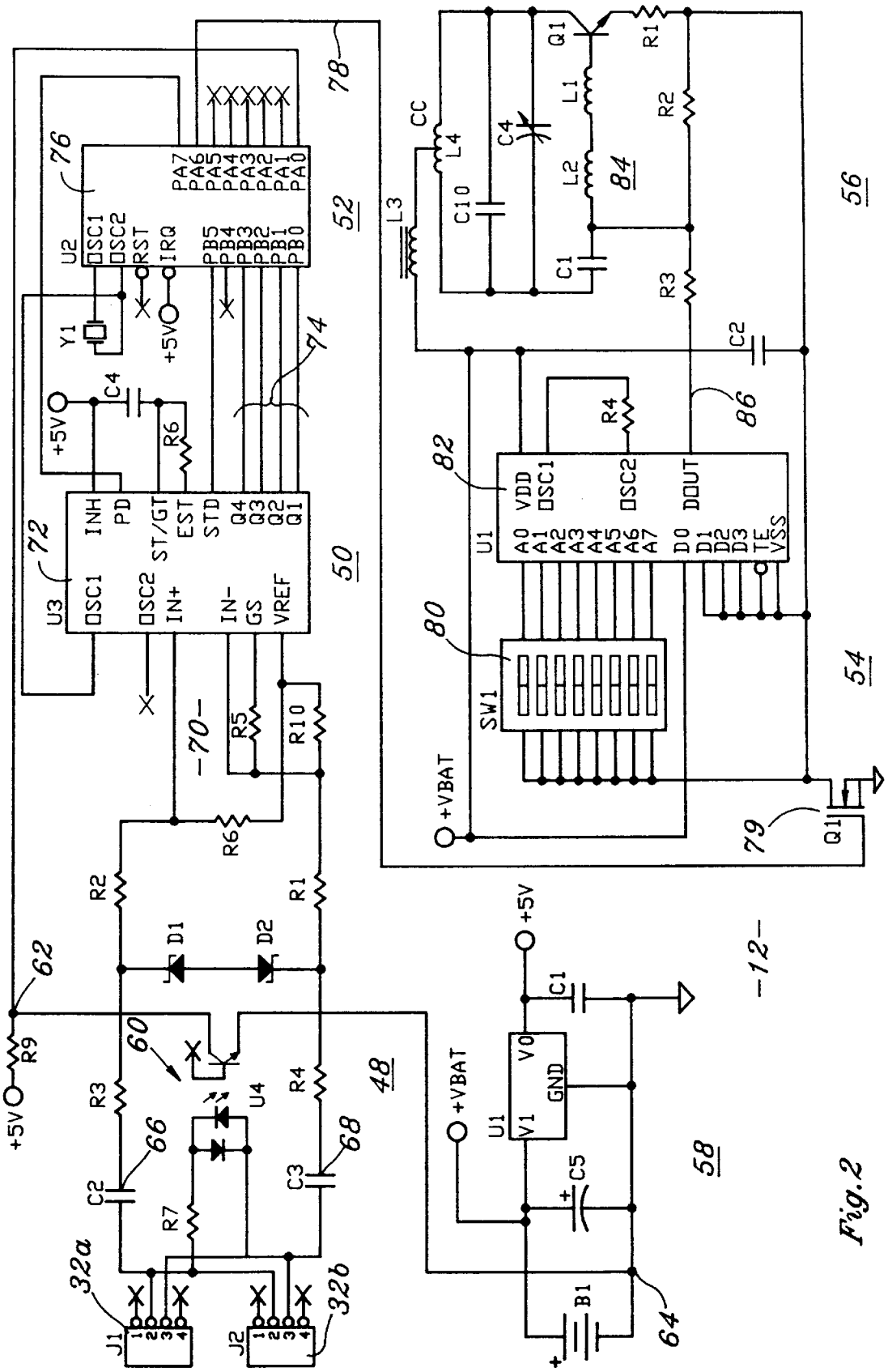
Figure 3:
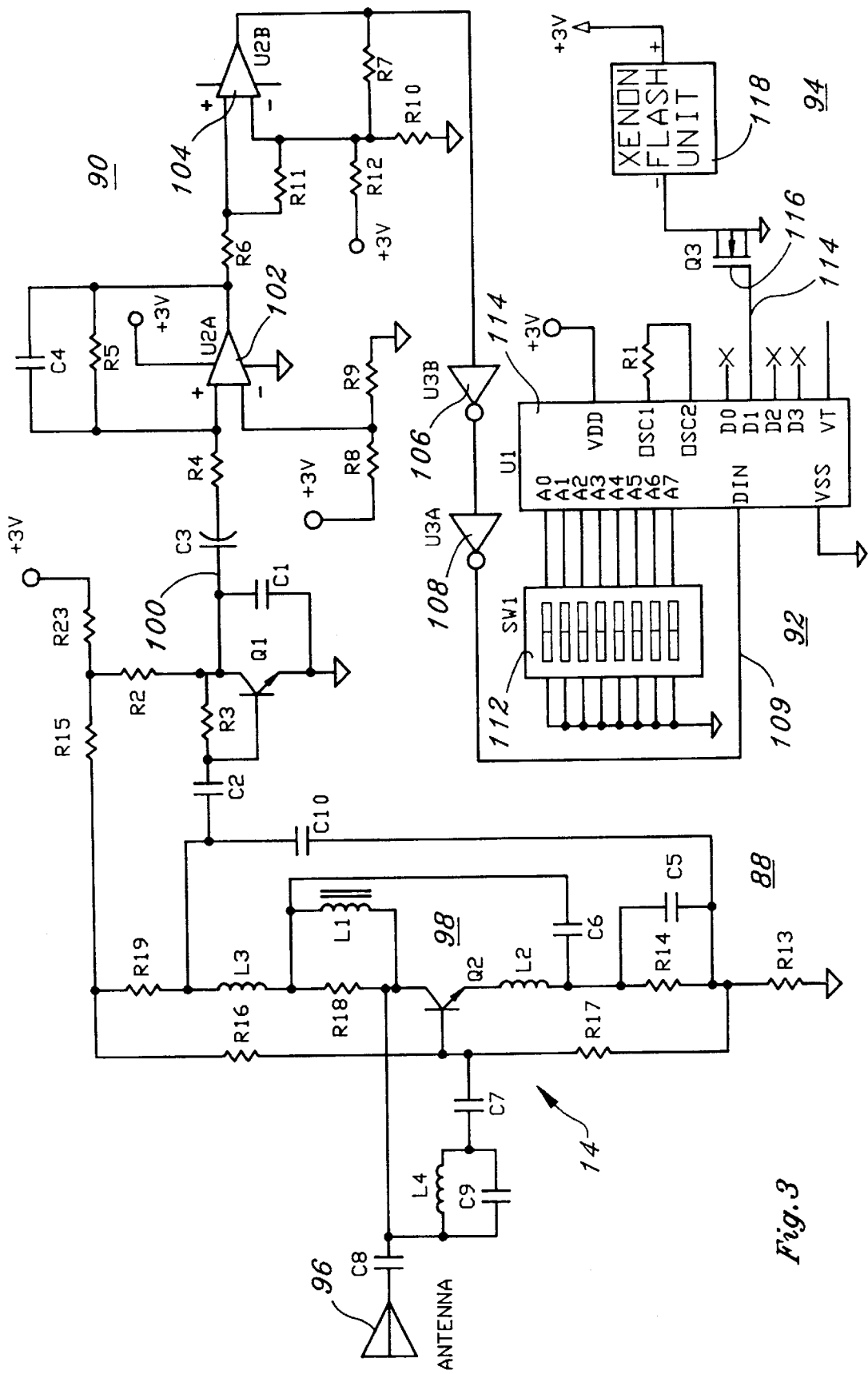

The invention will be better understood by reference to the following description, taken in connection with the accompanying drawing, in which:

FIG. 1 is a simplified schematic drawing of two emergency signalling systems, one of which has been activated by dialing an emergency number, FIG. 2 is a schematic circuit diagram of the telephone monitor/transmitter portion of the emergency signalling system, and FIG. 3 is a schematic circuit diagram of the receiver/signal beacon portion of the emergency signalling system.

DESCRIPTION OF THE PREFERRED EMBODIMENT

Referring now to FIG. 1 of the drawing, a first emergency response system shown generally at 10 comprises a telephone monitor/transmitter (TMT) 12 and a receiver/signal beacon (RSB) 14. A second emergency signalling system shown generally at 16 comprises a telephone monitor/transmitter 18 of identical construction to unit 12 and a receiver/signal beacon 20 identical to unit 14. The emergency signalling systems 10 and 16 are located in the vicinity of one another within the range of radio signals as described later in the following description. Emergency response system 10 is installed to service a residence or office having one or more telephone handsets 22, 24 with dialing keys and which are connected to a common telephone line 26 by means of modular jacks 28, 30. The TMT 12 is interposed between modular jack 30 and telephone 24 by means of a pass-through modular jack 32. The other portion of the emergency response system 10 is the receiver/signal beacon 14. RSB 14 is battery powered and located so as to be visible from the exterior of the building in which telephones 22, 24 are located, and within range of the radio signal indicated at 34. RSB 14 may be placed in a window which is viewable form the street, or on the exterior of the building.

Similarly, the emergency response system 16 includes one or more telephone handsets such as 36, one of which is connected to a telephone line 38 via modular jack 40. TMT 18 is interposed between telephone 36 and telephone line 38 by means of a pass through modular jack 42. TMT 18 is arranged to transmit a radio signal to RSB 20 which is located so as to be externally visible and to facilitate guiding an emergency response team to the location of the telephone 36. RSB 20 is also within the range of a radio signal transmission from TMT 12 as indicated by reference numeral 44. RSB 14 and RSB 20 each contain flashing strobe lights which may be activated by an external radio signal. The strobe light of RSB 14 is shown to be activated to produce a bright flashing light 46, whereas the strobe light of RSB 20 is not activated.

OVERALL DESCRIPTION

A complete description of the emergency response system will be provided in connection with FIGS. 2 and 3 of the drawing. However an overall description of the functioning of emergency response system 10 is as follows.

The complete system consists of two components: a telephone monitor/transmitter and at least one remotely located receiver/signal beacon.

Detailed technical discussion will be limited first to TMT 12, which is depicted in the block diagram of FIG. 1.

The telephone monitor/transmitter 12 connects to the telephone line via an RJ-11 modular jack 30. A second jack 32 is provided as a convenient pass-through, connection for a telephone handset (shown in FIG. 1). Therefore, no modification or addition to the premises telephone wiring is required. The unit 12 is powered by a single 9 volt battery.

When any phone in the residence is taken off-hook, the TMT 12 will listen for the 9-1-1 dial sequence or other selected sequence of emergency digits, and test it in programmed computer logic to ascertain that it is a true emergency. Upon its detection, an RF transmitter is activated which sends a coded signal to the remotely located RSB 20. When the RSB 20 receives the signal, it will activate a bright, flashing light, intended to attract emergency personnel. The light will continue to flash for a time delay of thirty minutes or until the unit is reset via a switch located on the phone monitor.

A test mode is provided to prevent false 9-1-1 (or other emergency digit sequence) calls to emergency personnel. By dialing 9-9-9, the unit is activated in the same manner as a real 9-1-1 emergency. This mode is useful to ensure that placement of the beacon is within the range of the transmitter in the phone monitor.

The TMT 12 circuit consists of a DTMF detector, a microcontroller, and a 308 MHz transmitter. The microcontroller is used to monitor hook status, dialed digits, and provide various time-out functions.

The circuit remains powered in either the on-hook or off-hook condition. However, when the phone is on-hook, the microcontroller and DTMF detector remain in a low power "sleep" state and draw very little current from the battery. The circuit has no effect on telephone voice quality and does not interfere with telephone signaling and detection equipment. The circuitry is protected from line transients by a current limiting resistor as well as transient suppressors across the line.

When the telephone handset is taken off-hook, an interrupt is generated that causes the microcontroller to exit from the low power STOP mode. After a brief reinitialization, the microcontroller is ready to process dialed digits. A program in the microcontroller provides a logic tool to insure that the dialed digits constitute a valid emergency dialed number. A radio signal is transmitted which is encoded so as to match a preselected code set in RSB 14.

The RSB 14 circuitry consists of a power supply, a regenerative RF receiver, a decoder, and a lamp driver. Power is supplied by two "C" cell alkaline batteries. Once the RSB 14 has been given the "ON" command, a software timer begins a countdown sequence. After thirty minutes have expired, the RSB is sent a shut-off command, the system is reset, and is again ready to monitor another call.

TELEPHONE MONITOR/TRANSMITTER

FIG. 2 is a schematic circuit diagram of the telephone monitor/transmitter 12 shown in FIG. 1. TMT 12 comprises a telephone line interface section shown generally at 48, a DTMF tone detector section 50, a programmable microcontroller 52, a data encoder 54, an RF transmitter section 56, and a power supply 58.

The telephone line interface section 48 comprises a pair of parallel-connected RJ-11 jacks 32a, 32b, each having a pair of terminals connected to a photodiode opto-coupler 60 with an output transistor. When the telephone is on-hook current flows to the photodiode opto-coupler, turning on the output transistor. When it is lifted off-hook, current flow is interrupted, causing the transistor output of the opto-coupler to switch off. The opto-coupler switched output is connected to make a connection between a terminal 62 and a terminal 64 so as to comprise a off-hook detector.

The terminals of jacks 32a, 32b are also connected via isolation capacitors 66, 68 to a conventional tone dial input circuit 70 serving as an input to a conventional DTMF detector 72, such as Mitel number MT88L70. DTMF detector 72 operates in a well-known fashion to translate a dual tone multifrequency signal into an encoded digit supplied to data output terminals connected to data lines 74, which in turn, are connected to data input terminals of an eight-bit microcontroller 76. Microcontroller 76 is a programmable device having an internal operating system ROM, an EPROM programmed for the present application. An internal RAM is connected to receive data inputs corresponding to the dialed digits via lines 74 and to provide an output over a line 78 when actuated by the program indicating that an emergency signal is to be transmitted. A suitable microcontroller is Motorola number MC68HC05J1A, which has a standard instruction set for entering a program into an electrically programmable read only memory (EPROM). The microcontroller also includes a low power "STOP" mode in which internal processing including timer operation is halted to conserve power until brought out of the low power STOP mode by an external signal, here from the off-hook detector. The microcontroller also includes a programmable timer, which may be programmed to reset the system after a selected time delay, such as a thirty minute delay.

Programming of the microcontroller functions is by means of a program residing in the EPROM which may not be altered by the user and also by means of data transmitted to the RAM when selected programming digits are dialed on the telephone handset. In the present preferred embodiment, the programming digits consist of two entries of the decoded DTMF signal corresponding to keying the "#" symbol on the standard telephone handset. Thus "##" is recognized as a user program request. The sequence "##1" shall indicate that the following digits, terminated by a single "#" will comprise a selected sequence of emergency digits which will provide an output signal (first signal) from the microcontroller over line 78. The sequence "##2" shall apply to another selected sequence of emergency digits. As an example, to program the telephone number (212)555-1212 as a number to be recognized in an emergency situation, the user would lift the handset off-hook, then dial ##12125551212#, then replace the handset on hook. Thus several selected sequences of emergency digits may be selected and changed by the user. The standard 9-1-1 sequence is preloaded into the system, since this is a generally needed sequence of emergency digits.

In addition to capability for the user to program additional selected sequences of emergency telephone numbers, the reset time delay is adjustable by dialing a program request using the "*" key as a programming key with suitable digits appended to set the time delay. This feature will accommodate users in areas where emergency response times may be significantly longer than the average response time which is preprogrammed into the unit.

The following program is written in pseudocode so as to be applicable to any computer, and is suitable for customizing by one skilled in the art to obtain a program for the EPROM of the Motorola microcontroller.

```
Reset
        Initialize memory
        Initialize hardware
        Initialize Timer
        Enable Interrupts
        Go To Main Program Loop
end Reset
Main Program Loop
        Enter Sleep Mode (Wait for Interrupt from Hook-Switch)
        Return From Interrupt
        De-bounce Hook Switch
        While Handset Off-Hook
                Enable DTMF Detector
                Initialize 15 sec. Timer
                While Timer < 15 Seconds
                        While Digit Count < 12
                                If DTMF Data Available
                                        Get DTMF digit
                                        Save in Buffer
                                        Increment Digit Count
                                        Validate Digits
                                else
                                        Wait
                        end While
                End While
        Reset Hook Interrupt
        Disable DTMF Detector
        Go To Main Program Loop
End Mail Program Loop
Interrupt
        do nothing
Return
Subroutines
Validate Digits
        While Digit Count = 2
```

-continued

```
                If Received Digits = ##
                        then Program Mode
        End While
        While Digit Count = 3
                If Received Digits = 911
                        then Transmit
                If Received Digits = 999
                        then Transmit
        end While
        While Digit Count > 6
                If Received Digits = User Number 1
                or if Received Digits = User Number 2
                or if Received Digits = User Number 3
                        then Transmit
        end While
End Validate Digits
Transmit
        Initialize Strobe Timer
        While Timer < Response Time
                Enable Transmitter
        End While
        Reset Hook Interrupt
        Disable DTMF Detector
End Transmit
Program Mode
        Initialize Digit Count
                If DTMF Data Available
                        Get DTMF digit
                        If digit = 0 thru 9 then
                                Save User Program Number
                                Increment Digit Counter
                        else If digit = * then Program Response
Time
                else wait
        While Digit Count > 1 and Digit Count < 13
                If DTMF Data Available
                        Get DTMF digit
                        If Digit = 0 thru 9 then
                                Save Digit in Selected User Num-
ber
                                Increment Digit Count
                        else If Digit = #
                                Save Digit in Selected User Num-
ber
                                End If
                else
                                Wait
        end While
End Program Mode
Program Response Time
        Initialize Digit Count
                While Digit Count < 2
                        If DTMF Data Available
                                Get DTMF digit
                        else wait
                        If digit = 0 thru 9 then
                                Save digit in buffer
                End While
        Convert buffer digits to minutes
        Store minutes in Response Time
End Program Response Time
```

The line of the program in the "transmit" subroutine which is entitled "Enable Transmitter" serves to send a first signal to the output line 78 from microcontroller 76. The output line 78 from microcontroller 76 is connected so as to operate a transistor switch 79 connecting the data encoder 54 and transmitter 56 circuits to ground, enabling them to operate. The output terminals of an eight position dip switch 80 are connected to an encoder 82, such as Holtek number HT- 12E. The eight switches are set to select an eight-bit binary code word, such as 10110011. RF transmitter circuit 84 produces a 308 MHz carrier signal which is modulated by the binary code word on data output line 86 from the encoder. The transmitter section 56 transmits an encoded radio signal, which is modulated by the binary code word set on dip switch 80 in a manner well known in the art.

RECEIVER/SIGNAL BEACON

Referring now to FIG. 3 of the drawing, the receiver/signal beacon shown generally at 14 includes an RF receiver section 88, a data shaping section 90, a decoder section 92, and a flashing beacon unit 94. The RF receiver 88 is connected to receive a 308 MHz signal over antenna 96. A conventional regenerative receiver circuit 98 is powered by its own 3 volt battery power supply and provides an output signal over line 100 to data shaping circuit 90. The data shaping circuit includes a comparator 102 and amplifier 104 connected through CMOS Hex buffers 106, 108 to the serial data input terminal of a decoder 110. The purpose of the shaping circuits is to sharpen the edges of the incoming data pulses and to convert the recovered data to the appropriate logic levels.

Decoder 110 may suitably be furnished by using a Holtek Model HT-12E remote control encoder. The eight parallel data inputs of decoder 110 are also connected to an eight position dip switch 112. The dip switch 112 is set with the switches in the same position as dip switch 80 to select a second bit binary code word corresponding to the first binary code word, i.e., 10110011. The decoder 110 compares the first and second binary code words and if they correspond, sends an output over line 114. Output line 114 from decoder 110 operates a transistor switch 116 connected to one side of a commercially available Xenon flash unit 118. The other side of Xenon flash unit is connected to the 3 volt battery power supply. Xenon flash unit 118 creates a bright flashing light when switch 116 is closed. Decoder 110 is connected so that the wave shape of the encoded transmitted radio signal supplied to decoder 110 over line 109 corresponding to dip switch 80 setting must match the selectable binary code word set with dip switch 112 in order to provide an output signal over line 114. A suitable flash unit design is shown in Design U.S. Pat. No. 353,549 issued Dec. 20, 1994 to Gorman.

The receiver/signal beacon 14 is completely portable, since it has a self contained battery power supply to operate the radio receiver and other circuits requiring a power supply, as well as supplying power for the flashing strobe light. It is actuated only when the binary code word on dip switch 112 corresponds to the binary code word on dip switch 80 of the telephone monitor/transmitter 12. Therefore, an identical receiver/signal beacon in an adjacent living unit which has a different binary code word set on its dip switch will not be activated to turn on its flashing strobe light, as readily observable from FIG. 1. Similarly, a transmitted encoded signal from telephone monitor/transmitter 18 in FIG. 1 will actuate only its associated receiver/signal beacon 20 and not RSB 14 in the adjacent location.

The invention provides for ease and flexibility in locating the flashing strobe units. More than one RSB unit may be used by one user, e.g., by placing them on opposite ends of a living location and setting the switches to correspond to the transmitter switch, so that they may be actuated by that user's TMT. Any number of identical emergency response systems may be used in a large building complex of condominiums, apartments or offices, limited only by the number of code settings available on the dip switches.

The invention also provides for flexibility in programming in more than one emergency dialing sequence by the user. This enables the flashing beacon to be activated when any of a selectable sequence of digits is dialed. Also the time delay to reset the system is programmable by the user.

While there has been described what is considered to be the preferred embodiment of the invention, other modifications will occur to those skilled in the art, and it is desired to secure in the appended claims all such modifications as fall within the true spirit and scope of the invention.

What is claimed is:

1. An emergency response system comprising:
   (1) a telephone monitor/transmitter adapted for connection to a telephone line with a telephone handset having keys for dialing digits, said telephone monitor/transmitter comprising:
      (a) electronic circuit means adapted to be connected to the telephone handset and the telephone line for generating a first signal in response to sequential dialing of at least one selected sequence of emergency digits, said electronic circuit means including a programmable microcontroller having a program responsive to dialing programming digits on the telephone handset,
      (b) encoding means having a first plurality of setting switches for assigning a first selectable binary code word in response to said first signal,
      (c) a radio transmitter and modulator connected to said encoding means for transmitting a radio signal modulated by the first binary code word, and
   (2) at least one receiver/signal beacon, comprising:
      (a) a radio receiver demodulator adapted to receive and demodulate the radio signal and output the first binary code word,
      (b) decoding means having a second plurality of setting switches for assigning a second selectable binary code word and connected to compare the second binary code word with the first binary code word and to provide a second signal when the second binary code word matches the first binary code word, and
      (c) emergency signaling means comprising a flashing beacon arranged for placement in a location visible to emergency rescue personnel and connected to the decoding means to be actuated by the second signal.

2. The combination according to claim 1, wherein the microcontroller program is adapted to select a second selected sequence of emergency digits in response to dialing said programming digits, and to generate said first signal upon dialing either the first and second selected sequence of emergency digits.

3. An emergency response system comprising:
   (1) a telephone monitor/transmitter adapted for connection to a telephone line with a telephone handset having keys for dialing digits, said telephone monitor/transmitter comprising:
      (a) electronic circuit means adapted to be connected to the telephone handset and the telephone line for generating a first signal in response to sequential dialing of at least one selected sequence of emergency digits,
      (b) encoding means having a first plurality of setting switches for assigning a first selectable binary code word in response to said first signal,
      (c) a radio transmitter and modulator connected to said encoding means for transmitting a radio signal modulated by the first binary code word,
   (2) at least one receiver/signal beacon, comprising:
      (a) a radio receiver demodulator adapted to receive and demodulate the radio signal and output the first binary code word,
      (b) decoding means having a second plurality of setting switches for assigning a second selectable binary code word and connected to compare the second binary code word with the first binary code word and to provide a second signal when the second binary code word matches the first binary code word, and (c) emergency signaling means comprising a flashing beacon arranged for placement in a location visible to emergency rescue personnel and connected to the decoding means to be actuated by the second signal, and (3) wherein the telephone monitor/transmitter further includes a timer arranged to reset the receiver/signal beacon and turn off the flashing beacon after a selected time delay, and wherein the telephone monitor/transmitter electronic circuit means includes a programmable microcontroller adapted to adjust the selected time delay in response to dialing a programming digit on the telephone handset.

* * * * *